United States Patent
Zhou et al.

(10) Patent No.: US 11,073,635 B2
(45) Date of Patent: Jul. 27, 2021

(54) COMPENSATED SPECTROSCOPY MEASUREMENTS

(71) Applicant: Schlumberger Technology Corporation, Sugar Land, TX (US)

(72) Inventors: Tong Zhou, Sugar Land, TX (US); David Rose, Sugar Land, TX (US); Jeffrey Miles, Arlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 97 days.

(21) Appl. No.: 16/442,302

(22) Filed: Jun. 14, 2019

(65) Prior Publication Data

US 2019/0383962 A1    Dec. 19, 2019

Related U.S. Application Data

(60) Provisional application No. 62/684,765, filed on Jun. 14, 2018.

(51) Int. Cl.
*G01V 5/10* (2006.01)

(52) U.S. Cl.
CPC .............. *G01V 5/102* (2013.01); *G01V 5/101* (2013.01); *G01V 5/104* (2013.01)

(58) Field of Classification Search
CPC ......... G01V 5/101; G01V 5/102; G01V 5/104
See application file for complete search history.

(56) References Cited

U.S. PATENT DOCUMENTS

| | | |
|---|---|---|
| 4,788,424 A | 11/1988 | Preeg |
| 4,937,446 A | 6/1990 | McKeon et al. |
| 5,045,693 A | 9/1991 | McKeon et al. |
| 5,408,097 A | 4/1995 | Wraight et al. |
| 5,471,057 A | 11/1995 | Herron |
| 2008/0023629 A1 | 1/2008 | Herron et al. |
| 2012/0091328 A1 | 4/2012 | Suparman |
| 2014/0042311 A1 | 2/2014 | Zhou et al. |
| 2014/0343857 A1 | 11/2014 | Pfutzner et al. |
| 2016/0077234 A1 | 3/2016 | Zhou et al. |
| 2016/0195636 A1 | 7/2016 | Grau et al. |
| 2018/0113233 A1* | 4/2018 | Vinokurov ............... G01V 5/06 |
| 2019/0129061 A1 | 5/2019 | Zhou |

OTHER PUBLICATIONS

J. A. Grau, J. S. Schweitzer, "Elemental Concentrations from Thermal Neutron Capture Gamma-ray Spectra in Geological Formations", Nucl. Geophys. vol. 3, No. 1, pp. 1-9, 1989, Int. J. Radiat. Appl. Instrum. Part E.

J. A. Grau, J. S. Schweitzer, D. V. Ellis, R. C. Hertzog, "A Geological Model for Gamma-ray Spectroscopy Logging Measurements", Nucl. Geophys. vol. 3, No. 4, pp. 351-359, 1989.

* cited by examiner

*Primary Examiner* — Mark R Gaworecki

(74) *Attorney, Agent, or Firm* — Trevor G. Grove

(57) ABSTRACT

Elemental concentrations in subterranean formations may be determined using neutron spectroscopy. For example, neutrons may be emitted by a downhole tool into the formation and produce gamma rays via inelastic scattering of fast neutrons or capture of slow neutrons. The borehole surrounding a downhole tool may introduce artifacts in the neutron spectroscopy measurement. Embodiments of the present disclosure are directed to techniques that reduce artifacts signals in downhole tools that include one or multiple detectors based at least in part on the inelastic and capture measurements.

18 Claims, 9 Drawing Sheets

COMPENSATED SPECTROSCOPY MEASUREMENTS

BACKGROUND

This disclosure relates to neutron-induced gamma-ray spectroscopy for determining concentrations of elements that are present in both the borehole and the formation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Producing hydrocarbons from a wellbore drilled into a geological formation is a remarkably complex endeavor. In many cases, decisions involved in hydrocarbon exploration and production may be informed by measurements from downhole well-logging tools that are conveyed deep into the wellbore. The measurements may be used to infer properties and characteristics of the geological formation surrounding the wellbore. The discovery and observation of resources using downhole techniques generally takes place down in the wellbore with sensors. These sensors may be a part of a tool-string that may be attached to a drill or other downhole device. One particular type of sensor uses a method of direct carbon measurement using neutron-induced gamma-ray spectroscopy. In an open-hole well, a type of analysis known as "oxide closure" may be used to identify certain features of the geological formation from neutron-induced gamma-ray spectroscopy. In a well that has been cased, however, oxide closure may not always produce accurate results. While techniques have been developed to avoid using oxide closure for cased-hole wells, these techniques may produce a result that varies depending on borehole conditions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment of the present disclosure relates to a system for determining a property of a geological formation that includes a neutron source configured to emit neutrons into a borehole of the geological formation. The system also includes two or more gamma-ray detectors configured to receive gamma rays resulting from interactions between the neutrons emitted by the neutron source and the geological formation to generate a plurality of independent measurements, wherein each independent measurement of the plurality of independent measurements is associated with a different region within a geological formation. Further, the system includes a processor. The processor is configured to acquire a first energy spectrum which contains at least in part a first independent measurement of the plurality of independent measurements. The processor is also configured to acquire a second energy spectrum which contains at least in part a second independent measurement of the plurality of independent measurements. Further, the processor is configured to determine the elemental concentration based at least in part on a combination of the first energy spectrum and the second energy spectrum.

Another embodiment of the present disclosure relates to a method for determining an elemental concentration in a geological formation. The method includes emitting neutrons, from a neutron generator placed into a borehole in the geological formation, to cause capture events and inelastic scattering events that generate photons. The method also includes detecting, using one or more detectors, the photons associated with the capture events to generate a plurality of independent measurements, wherein a first independent measurement of the plurality of independent measurements comprises capture measurements and wherein a second independent measurement of the plurality of independent measurements comprises inelastic measurement. Further, the method includes acquiring a first energy spectrum which contains at least in part the first independent measurement. Further still, the method includes acquiring a second energy spectrum which contains at least in part the second independent measurement. Even further, the method includes determining the elemental concentration based at least in part on a combination of the first energy spectrum and the second energy spectrum.

Another embodiment of the present disclosure relates to a method for determining an elemental concentration in a formation. The method includes a method for determining an elemental concentration in a geological formation. The method includes emitting neutrons, from a neutron generator, placed into the borehole in the geological formation, to cause capture and inelastic scattering events that generate photons. The method also includes detecting, using one or more detectors, the photons associated with the capture events to generate a plurality of independent measurements, wherein a first independent measurement of the plurality of independent measurements comprises early capture measurements and wherein a second independent measurement of the plurality of independent measurements comprises late capture measurements. Further, the method includes acquiring a first energy spectrum which contains at least in part the first independent measurement. Further still, the method includes acquiring a second energy spectrum which contains at least in part the second independent measurement. Even further, the method includes determining the elemental concentration based at least in part on a combination of the first energy spectrum and the second energy spectrum.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
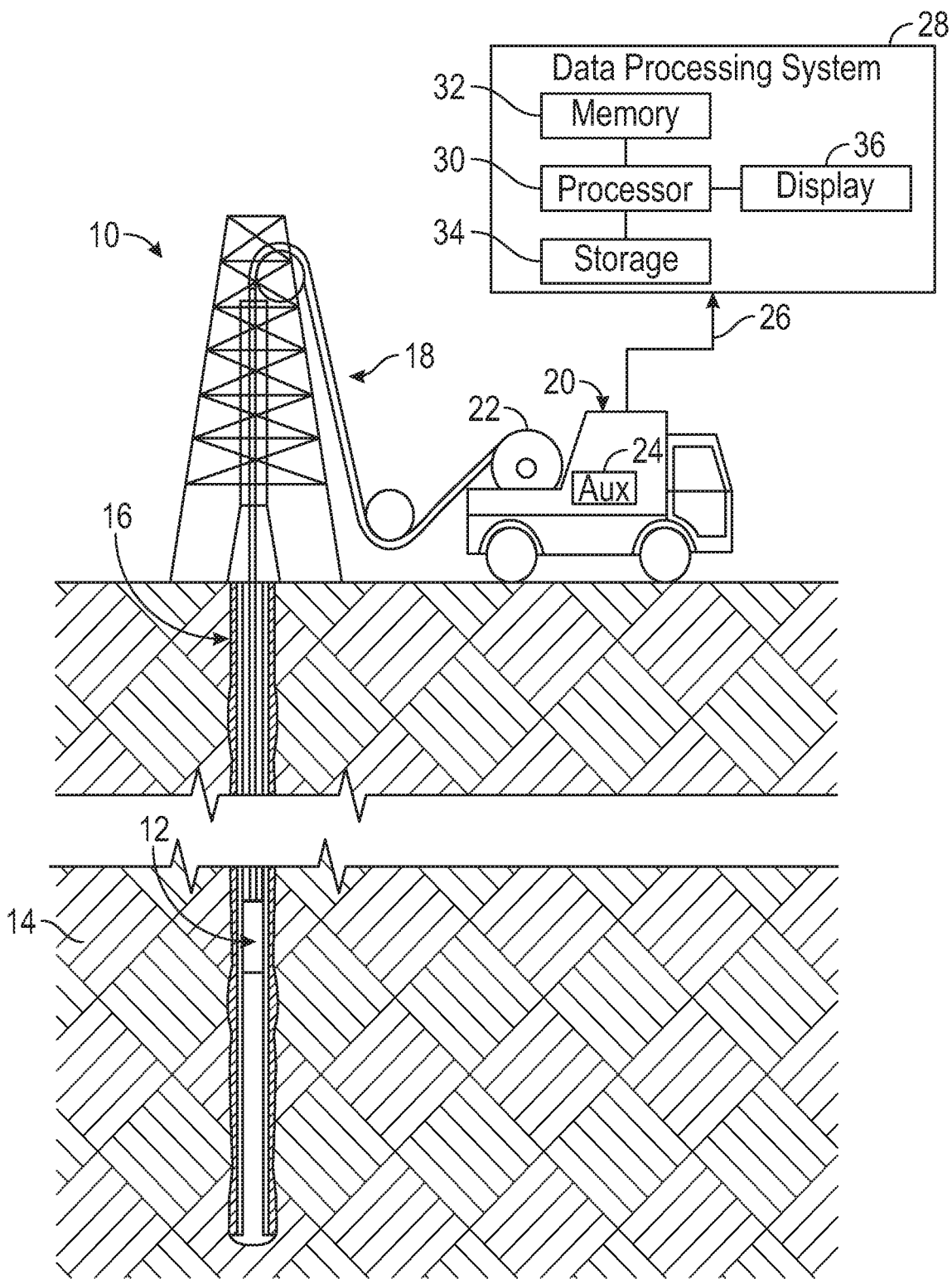
FIG. 1 is an example of a neutron-induced gamma-ray spectroscopy system, in accordance with an embodiment.

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As referred to herein, "independent" in the context of "independent measurements", "two measurements are independent," and the like, refers to data acquired by detectors that differs based at least on the region of a geological formation represented by the data. That is, a first independent measurement may be different from a second independent measurement in that each independent measurement is acquired by different detectors, is acquired at different DOIs with a single or multiple detectors, acquired at different timing gates (e.g., early timing gate and a late timing gate), or are from difference sources (e.g., capture or inelastic, early capture or late capture, and the like), or any combination.

Downhole neutron spectroscopy technology has been used to measure elemental concentrations in the oil and gas industry for several decades. Some neutron spectroscopy logging tools can measure the energy spectra of gamma rays that are induced by either inelastic scattering of fast neutrons or capture of slow neutrons. Elemental relative yields can then be computed from the measured energy spectra using a linear decomposition method or similar methods. In some embodiments, the elemental concentrations can be computed from the elemental relative yields, elemental sensitivities, and the FY2W factor, as shown in Equation 1 below:

$$W_i = FY2W \times \frac{Y_i}{S_i} \quad (1)$$

Here, $W_i$ is the weight fraction of the $i^{th}$ element with respect to the rock (on either a dry-weight or total-weight basis), $Y_i$ is the relative yield of the $i^{th}$ element, $S_i$ is the sensitivity of the $i^{th}$ element, and FY2W is the Factor of Yields to Weights, which accounts for all environmental effects that determine how the relative yields of the total spectrum are related to the weight basis of the set $W_i$. In some embodiments, the weight fraction of each element may be a weight percent, and the weight percent or fraction may be relative to some number of elements present in a formation, minerals in the formation, or a region within a formation. In reality, the presence of materials in the wellbore introduces complexity. If the $i^{th}$ element is present in the wellbore, a measurement will have some of the relative yield $Y_i$ coming from the wellbore so that the corresponding dry weight percent $W_i$ is a mix of wellbore and formation components.

Certain methods exist to compute FY2W from the available measured capture elemental relative yields. Among these methods are techniques that are collectively known as oxides closure. First, these methods disregard all the elements that exist in the formation pore space or wellbore (such as H, Cl, etc.), and the method assumes all other elements (Si, Ca, Fe, Mg, Al, etc.) may exist in formation rocks but not in the wellbore. Second, it assumes that all major rock elements are in the form of oxides or carbonates. Last, since the sum of the weight fractions of all rock elements, including the associated unmeasured oxygen and carbon, is equal to 1, one can back-compute the required FY2W value. In open-hole conditions, the assumption that there are no rock elements (Si, Ca, Fe, Mg, Al, etc.) in the wellbore works well. However, in cased hole conditions, this assumption may not be valid, since there could be Si or Ca in cement, and Fe in casing.

Certain methods use raw measurements from a spectroscopy tool to predict the FY2W values for both capture and inelastic yields without doing oxide closure. Using the predicted capture and inelastic FY2W, one can convert all the capture and inelastic elemental relative yields to apparent elemental concentrations. For the elements present in the formation and not in the borehole (e.g., or in substantially large amounts), the apparent elemental concentrations are essentially the formation elemental concentrations. For the elements present in both formation and borehole (H, O, Cl in borehole water; C in borehole oil; Ca and $S_i$ in cement, Fe in casing, etc.), the apparent elemental concentrations will have a borehole component and corrections may be applied to obtain the formation elemental concentration.

The present disclosure relates to techniques to determining properties (e.g., elemental concentrations) of different regions in a wellbore based on a differential sensitivity to the geological formation and the borehole, well completion, and the like. For example, the techniques may remove a borehole component in the apparent elemental concentrations from a wellbore and to get formation concentrations for formation evaluation applications. In one embodiment, the present disclosure is directed to determining an elemental concentration (e.g., weight percent or weight fraction) for one or more elements present in a formation or a subset of a formation. That is, the elemental concentration for each element represents a relative amount of each element compared to a subset of elements that are present within a formation. It should be appreciated by one of ordinary skill in the art that the elemental concentration may be used to determine an absolute concentration based on the formation bulk density and one or more measured elemental concentrations. One can also use the present techniques to remove the formation component and to get borehole elemental concentrations for applications relating to well integrity, production fluid holdup, and gravel pack evaluation. In some embodiments, additionally or alternatively, the elemental concentration for an element may be determined based on spectral standards for the element, where each spectral standard is specific for each of the at least two different regions (e.g., a formation region and a borehole region).

For a pulsed neutron tool equipped with two spectroscopy detectors, one can use the difference in the apparent elemental concentrations measured by the two detectors as a measure of the borehole elemental concentrations for borehole evaluation applications. One can also use the difference to compensate for the presence of the borehole contribution in the apparent elemental concentrations to get the accurate formation elemental concentrations for formation evaluation applications. The principle of these methods is that the two detectors will have different depths of investigation. The one with shorter source-to-detector spacing will read shallower and is more sensitive to the borehole and less sensitive to the formation. The one with longer source-to-detector spacing will read deeper and is more sensitive to the formation and less sensitive to the borehole. The relative sensitivities can be enhanced by back-shielding one or both of the detectors (U.S. Pat. Nos. 4,937,446A, 5,045,693A, Patent application: US20140343857A1) or by using a borehole fluid excluder behind one of the detectors (U.S. Pat. No. 5,408,097A), which are incorporated herein by reference in their entireties and for all purposes.

A similar compensation can also be done based on a single spectroscopy detector. For the elements that can be measured by both capture and inelastic spectroscopy (including but not limited to $S_i$, Ca, Mg, S, Al, Fe, etc.), one can use the difference between the capture and inelastic apparent elemental concentrations for borehole evaluation or to compensate the borehole component to get formation concentrations for formation evaluation. This is because the inelastic spectroscopy has a shallower depth of investigation (DOI) than the capture one. For the elements that may be measured by capture spectroscopy, one can, additionally or alternatively, use the difference between the capture spectra in an earlier timing gate and a later timing gate. This is because an early capture spectrum has a shallower DOI than the late one.

With the foregoing in mind, FIG. 1 illustrates a well-logging system 10 that may employ the systems and methods of this disclosure. The well-logging system 10 may be used to convey a downhole tool 12 through a geological formation 14 via a borehole 16. In the example of FIG. 1, the downhole tool 12 is conveyed on a cable 18 via a logging winch system (e.g., vehicle 20). Although the vehicle 20 is schematically shown in FIG. 1 as a mobile logging winch system carried by a truck, the vehicle 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the vehicle 20 and/or the downhole tool 12.

Moreover, while the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable downhole tool that uses neutron-induced gamma-ray spectroscopy within the borehole 16 (e.g., downhole environment). The gamma-ray spectroscopy may include, but is not limited to, inelastic, capture, or delayed activation gamma-ray spectroscopy. For example, the gamma-ray spectroscopy may include any suitable neutron-induced gamma-ray spectroscopies.

As discussed further below, the downhole tool 12 may receive energy from an electrical energy device or an electrical energy storage device, such as the auxiliary power source 24 or another electrical energy source to power the tool. Additionally, in some embodiments the downhole tool 12 may include a power source within the downhole tool 12, such as a battery system or a capacitor to store sufficient electrical energy to activate the neutron emitter and record gamma-ray radiation.

Data signals 26 may be transmitted from a data processing system 28 to the downhole tool 12, and the data signals may be related to the spectroscopy results may be returned to the data processing system 28 from the downhole tool 12, additionally, the data signals 26 may include control signals. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display images generated by the processor 30. The data processing system 28 may be a local component of the vehicle 20 (e.g., within the downhole tool 12), a remote device that analyzes data from other vehicles 20, a device located proximate to the drilling operation, or any combination thereof. In some embodiments, the data processing system 28 may be a mobile computing device (e.g., tablet, smart phone, or laptop) or a server remote from the vehicle 20.

Figure 2:
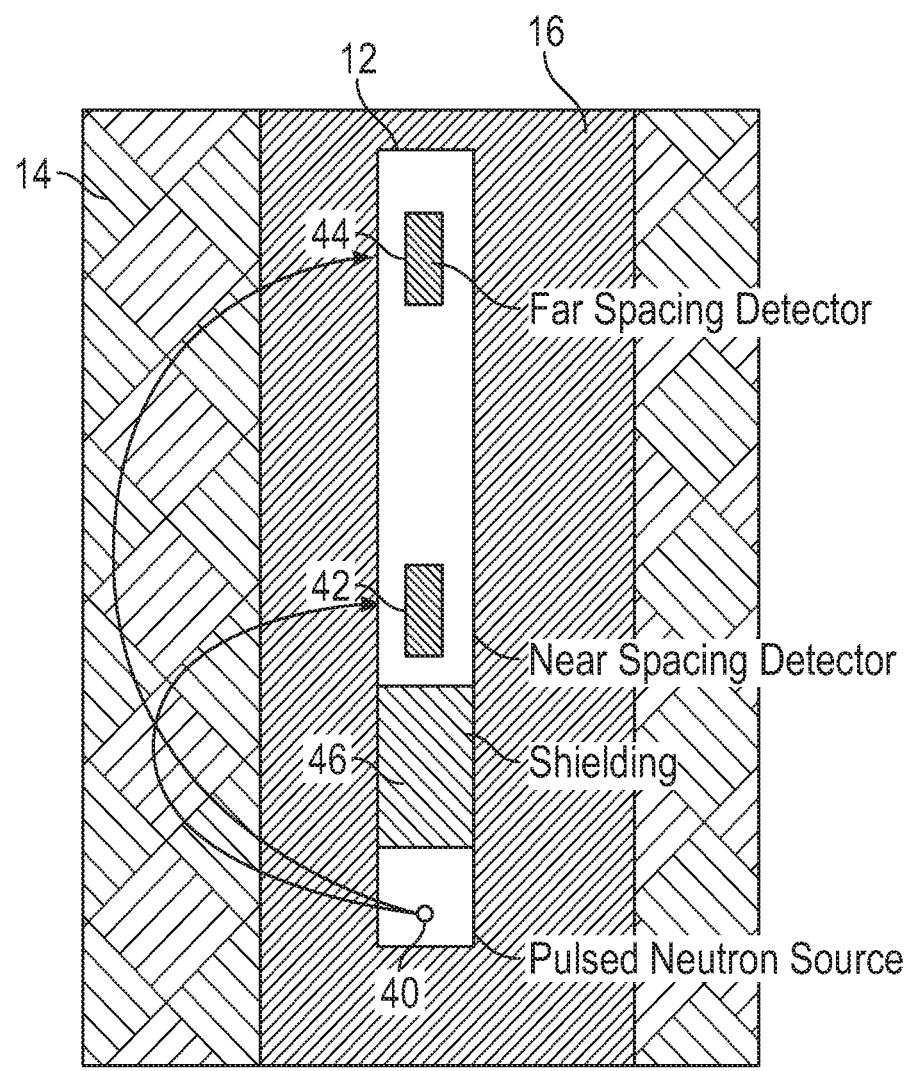
FIG. 2 is an example of a neutron-induced gamma-ray spectroscopy downhole tool, in accordance with an embodiment.

FIG. 2 shows a downhole tool 12 for detecting neutron-induced gamma ray spectroscopy. As shown, the downhole tool 12 includes two gamma ray detectors (e.g., first detector 42 and second detector 44). However, in certain embodiments, the downhole tool 12 may have one scintillator gamma ray detector (e.g., first detector 42 or second detector 44). Some of the methods in this disclosure can be applied to single-detector spectroscopy tools, and some are more suitable for multi-detector spectroscopy tools. The downhole tool 12 is equipped with a neutron source 40 (e.g., pulsed neutron generator (PNG)) that emits neutrons (e.g., generally illustrated by the arrow 41). A PNG may be turned on and off repeatedly in a pattern. Additionally, the downhole tool 12 includes shielding 46 that may prevent neutrons from the neutron source 40 from transmitting directly into the first detector 42 and second detector 44 (e.g., without first passing through the geological formation 14 or borehole 16).

Figure 3:
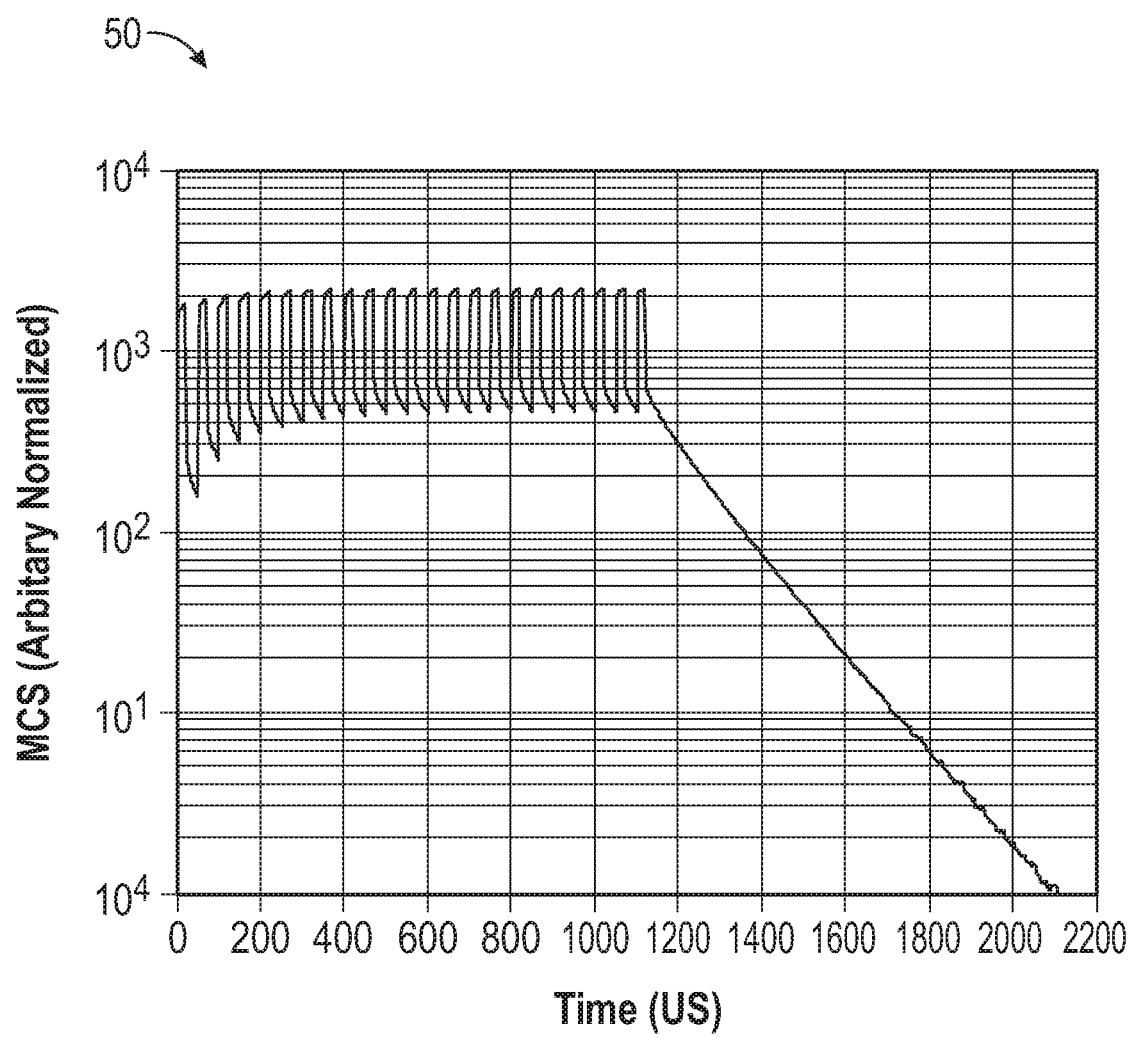
FIG. 3 shows a pulsing scheme, in accordance with an embodiment.

The instantaneity of the inelastic gamma-rays and the decay of capture gamma-rays can be seen in plot 50 of FIG. 3 where the x-axis depicts time in μs and the y-axis depicts a normalized count rate of both types of detected gamma-rays on a logarithmic scale. The difference between capture and inelastic gamma-rays can be seen from the result of a PNG pulsing scheme. The pulsing scheme may include multiple "on" periods (e.g., indicated by the peaks) and "off" periods of the neutron source and an extended off period, which result in the gamma-ray detections of plot 50. For example, the on periods may be 20 μs, the off periods may be 30 μs, and an extended off period may extend, for example, up to 1 millisecond. However, multiple different pulsing schemes of on periods and off periods may also be used.

In the illustrated embodiment shown in plot 50, when an on period begins, the count rate may instantly jump due to the increase in inelastic gamma-ray detection. Similarly, when an additional off period begins, the count rate may immediately drop. Conversely, during the span of an on period, the count rate may continuously increase due to the increase in capture gamma-rays. Likewise, during a subsequent off period, the count rate may decrease exponentially due to capture gamma-ray decay emissions. Throughout the pulsing scheme, measurements pertaining to the energy levels of the gamma-rays may also be taken to determine elemental relative yields of the environment. In some embodiments, the pulsing scheme may be repeated multiple times to gather more data.

After the final pulse of the pulsing scheme, the extended off period may begin. An exponential decay relates to the decay of the isotopes in the environment and the detection of corresponding capture gamma-rays. The decay constant of the decay may be correlated (i.e., inversely proportional) to a sigma value representative of properties of the borehole 16 and geological formation 14 (e.g., sigma). However, due to the elements within and the geometries and properties of the borehole 16 and the geological formation 14, the borehole 16 and formation 14 may have different sigma values (borehole sigma and formation sigma). To account for both, an apparent sigma may be calculated to balance the effects from each location. Additionally, borehole sigma and formation sigma may be correlated to the decay more or less at different times during the decay 64. For example, earlier times during the decay may have more borehole effect on the apparent sigma than later times. As such, the use of timing gates when taking measurements and determining the apparent sigma may be done judiciously to achieve a balance of the borehole sigma and formation sigma. More details can be found in US patent application 2014/0042311 A1, which is incorporated herein by reference in its entirety for all purposes.

Figure 4:
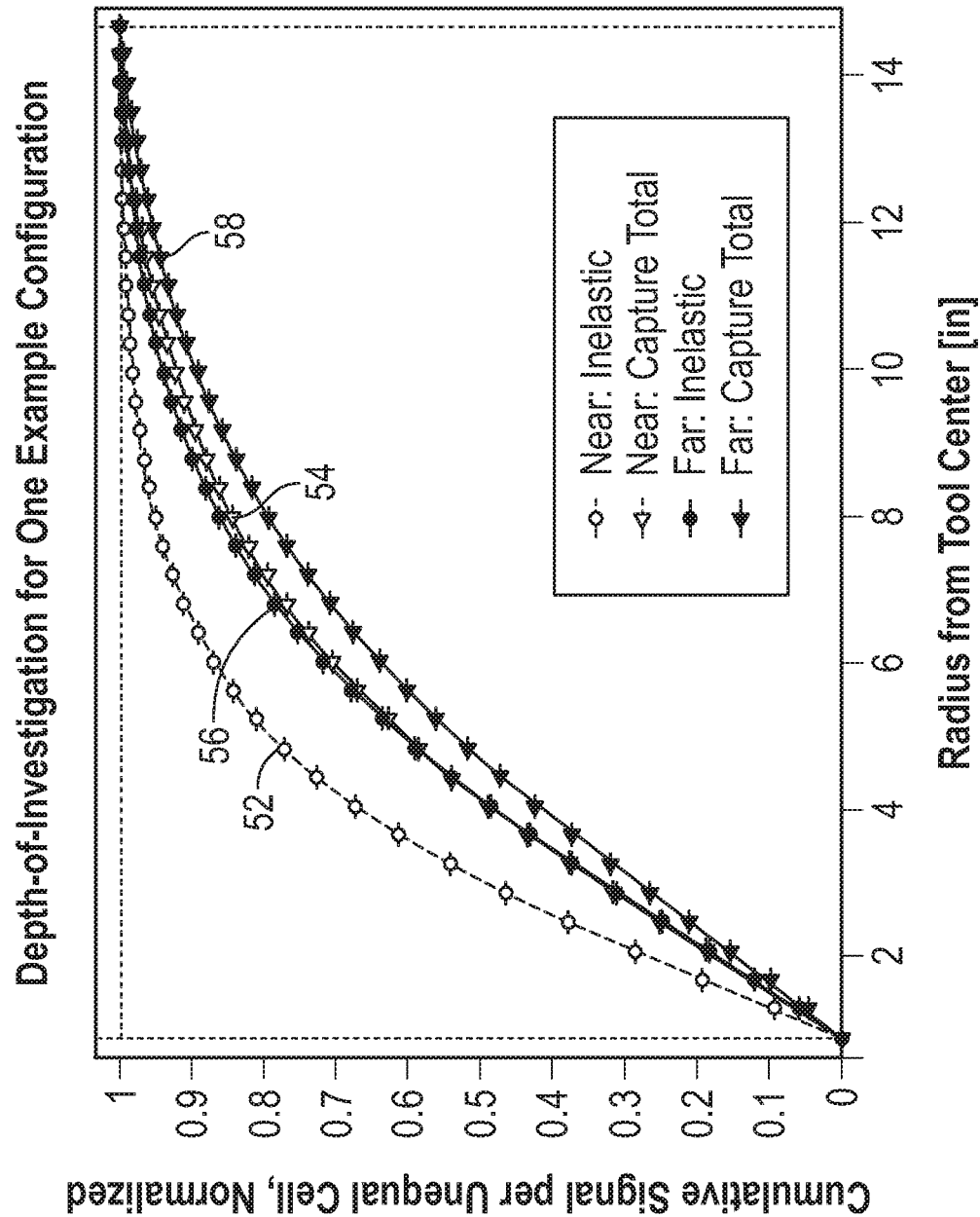
FIG. 4 shows capture and inelastic cumulative fractional signals detected by a first detector and a second detector as a function of depth of investigation, in accordance with an embodiment in an open hole condition.

The radial depth of investigation of the measurement is affected by several factors, including: the source-to-detector spacing, the reaction giving rise to the spectrum (either inelastic or capture), and the timing of the capture spectrum acquisition. FIG. 4 shows a comparison of the cumulative signal received from increasing radial depths. The signal from the inelastic and capture reactions are plotted separately for each of two detectors with different spacing. That is, lines 52 and 54 are the Near inelastic signal and capture signal, respectively (referred to as "Near" because they are measured by the first detector 42, which is nearer to the neutron source 40 than the second detector 44). The lines 56 and 58 are the Far inelastic signal and capture signal, respectively (referred to as "Far" because they are measured by the second detector 44, which is farther from the neutron source 40 than the first detector 42). On average, a Far-spaced detector (e.g., second detector 44) receives a deeper signal in terms of depth of investigation (DOI) than does a Near-spaced detector (e.g., first detector 42), and the capture signal can be deeper than the inelastic signal. These aspects of the measurement may be understood as follows.

The inelastic spectroscopy measurement is based on the spectrum of gamma rays induced by inelastic reactions of fast neutrons with the nuclei around the tool. The capture spectroscopy measurement is based on the spectrum of gamma rays induced by the capture of slow neutrons by the nuclei around the tool. The inelastic signal can have a shallower depth of investigation (DOI) than the capture signal, because the inelastic signal can be generated by fast neutrons above a certain energy threshold (approximately 1 MeV). After a small number of collisions with the surrounding medium (one collision or at most a few collisions), neutrons have fallen below the energy threshold for inelastic reactions. Capture reactions preferentially occur for slow neutrons near thermal equilibrium with the surrounding medium. The neutrons giving rise to capture reactions therefore undergo many more collisions and are likely to diffuse outward from the tool before being captured. The result is that the point-of-origin for the capture spectrum is typically deeper than that of the inelastic spectrum, on average.

At the same time, the DOI of each detector depends on its distance from the source. The inelastic signal detected in a Far-spaced detector is more likely to originate from a deeper radial position, on average, than the inelastic signal for a Near-spaced detector. Similarly, the capture signal of a Far detector is deeper than in a Near detector.

Figure 5:
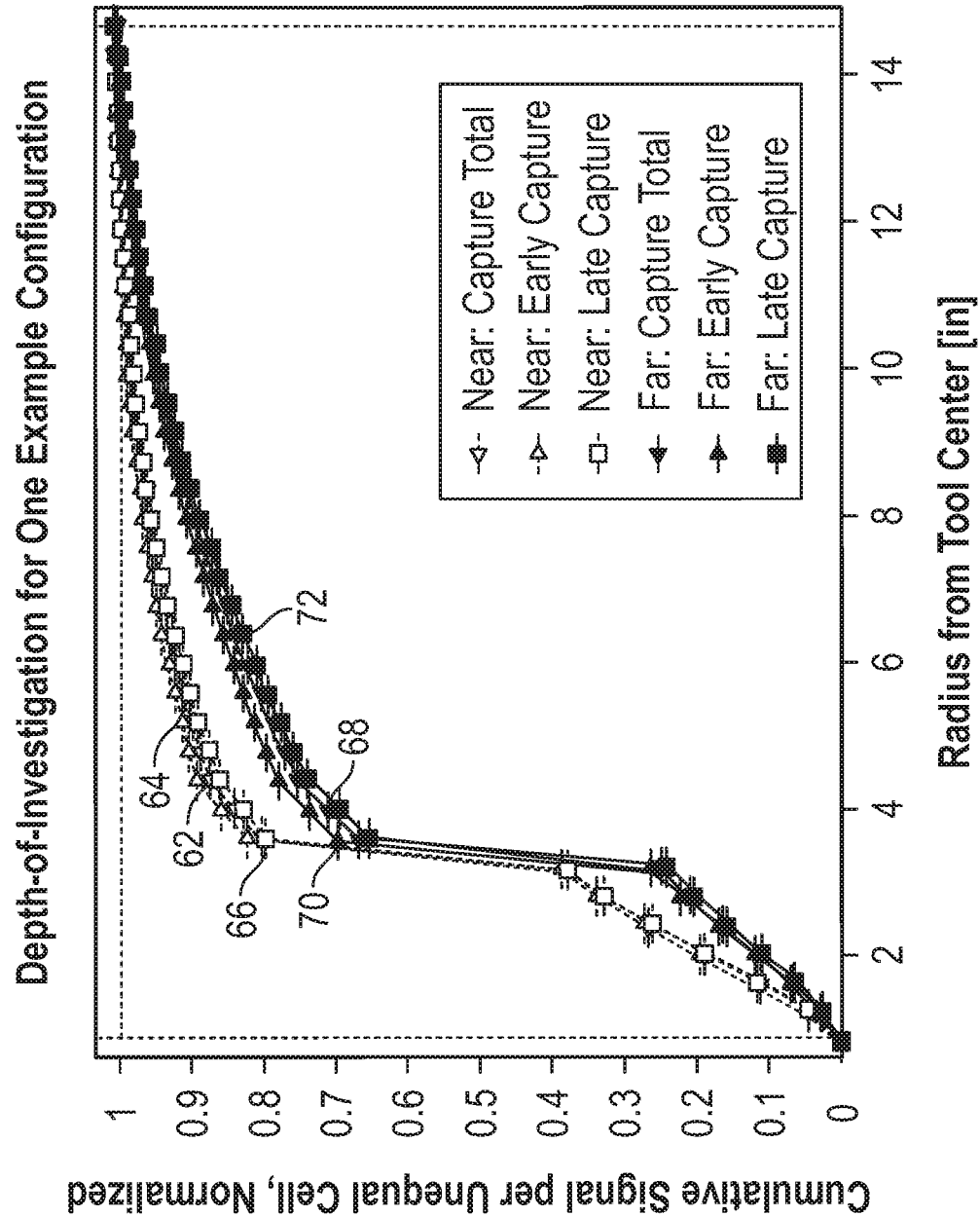
FIG. 5 shows various cumulative fractional signals detected by a first detector and a second detector as a function of depth of investigation, in accordance with an embodiment in a cased hole condition.

FIG. 5 shows how the radial DOI of the capture spectrum for two detectors is affected by the timing of the capture acquisition gates. Lines 62, 64, and 66 are the signals for Near (e.g., measured by first detector 42) capture total, early capture, and late capture, respectively. Lines 68, 70, and 72 are the signals for Far (e.g., measured by second detector 44) capture total, early capture, and late capture, respectively. The capture signal acquired late after the PNG burst comes from a deeper radial position, on average, than the capture signal acquired soon after the PNG burst. The late signal has more time for neutron diffusion to occur, which increases the relative population of neutrons at greater radial depths.

The basic principle of the spectral analysis may be simplified to the linear model shown below:

$$\text{Spec} = \sum_{i=1}^{N}(Y_i \cdot Std_i) \quad (2)$$

where "Spec" is the corrected measured net spectrum, which can be net capture or net inelastic. The correction includes pileup correction, background subtraction, gain, offset and non-linearity adjustment. "$Y_i$" is the capture or inelastic elemental relative yield for the $i^{th}$ element. "N" is the total number of elements to solve. "$Std_i$" is the elemental standard for the $i^{th}$ element after proper degradation to match the tool detector response. The degradation may include resolution degradation and non-Gaussian shape degradation. The elemental standards are known from laboratory measurements or modeling.

After solving Equation 2, one can get a set of capture yields and a set of inelastic yields for each spectroscopy detector. In some embodiments, it is helpful to convert the yields into elemental weight concentrations. In other embodiments, the present techniques can be applied to the yields directly.

Assuming an infinite homogeneous formation, and neglecting the borehole and logging tool geometry, the total counts N of gamma rays induced by neutrons can be written as in Equation 3:

$$N = \sum_i N_i = \sum_i \left( \phi \cdot N_A \cdot \rho_i \cdot \frac{\sigma_i}{M_i} \right) \tag{3}$$

where $\phi$ is the average neutron flux in the formation, $N_A$ is the Avogadro constant, $\rho_i$ is the partial density of the $i^{th}$ element, $\sigma_i$ is the gamma ray production cross section of the $i^{th}$ element, $M_i$ is the atomic mass of the $i^{th}$ element, and $N_i$ is the number of gamma rays produced from the $i^{th}$ element.

The relative yield of the $i^{th}$ element can then be calculated by Equation 4, taking its fractional contribution to the total gamma-ray production:

$$Y_i = \frac{N_i}{N} = \frac{\phi \cdot N_A \cdot \rho_i \cdot \frac{\sigma_i}{M_i}}{\sum_i \left( \phi \cdot N_A \cdot \rho_i \cdot \frac{\sigma_i}{M_i} \right)} \tag{4}$$

The sensitivity $S_i$ of the $i^{th}$ element may be defined as follows, using its mass-normalized gamma-ray production cross section:

$$S_i = \frac{\sigma_i}{M_i} \tag{5}$$

This form of the elemental sensitivity is simple because it describes gamma-ray production in the homogeneous medium, and may not describe the probability of gamma rays reaching a detector or being detected once there. The sensitivities for a realistic detection system may include these efficiencies, as will be discussed below.

By rearranging Equation 4, one can compute the weight fraction $W_i$ of the $i^{th}$ element based on the relative yield as follows:

$$W_i = \frac{\rho_i}{\rho} = \frac{\frac{Y_i}{S_i}}{\sum_i \frac{Y_i}{S_i}} = FY2W \cdot \frac{Y_i}{S_i} \tag{6}$$

In this infinite homogeneous case, the computation of the weight fraction based on the relative yield has been reduced to Equation 1. The conversion from the relative yield to the weight fraction is to apply a gain factor, called FY2W.

In a more realistic condition, the downhole geometry can be divided into borehole and formation regions. Equation 3 then becomes Equation 7, where the superscript "f" represents the formation and "b" represents the borehole.

$$N = \sum_i N_i^f + \sum_i N_i^b = \sum_i \left( \phi^f \cdot N_A \cdot \rho_i^f \cdot \frac{\sigma_i}{M_i} \right) + \sum_i \left( \phi^b \cdot N_A \cdot \rho_i^b \cdot \frac{\sigma_i}{M_i} \right) \tag{7}$$

In this case, the relative yield will contain the signal coming from both formation and borehole, as shown in Equation 8:

$$Y_i = \frac{N_i^f + N_i^b}{N} = \frac{(\phi^f \cdot \rho_i^f + \phi^b \cdot \rho_i^b) \cdot N_A \frac{\sigma_i}{M_i}}{\sum_i \left( \phi^f \cdot N_A \cdot \rho_i^f \cdot \frac{\sigma_i}{M_i} \right) + \sum_i \left( \phi^b \cdot N_A \cdot \rho_i^b \cdot \frac{\sigma_i}{M_i} \right)} \tag{8}$$

Using the same definition of elemental sensitivity as given in Equation 5, the yields of Equation 8 can be re-arranged to express the elemental weight fractions as follows:

$$W_i = \frac{\frac{Y_i}{S_i}}{\sum_i \frac{Y_i}{S_i}} = \frac{(\phi^f \cdot \rho_i^f + \phi^b \cdot \rho_i^b)}{(\phi^f \cdot \rho^f + \phi^b \cdot \rho^b)} \tag{9}$$

Here, $\rho^f$ is the total formation density and $\rho^b$ is the total borehole density; $\phi^f$ is neutron flux in the formation region and $\phi^b$ is neutron flux in the borehole region.

This approach is a first-order treatment for elemental sensitivities, because it assumes that gamma rays created in the borehole and formation have equal probabilities of being detected. In a more advanced treatment, it is possible to extend the expression for sensitivity by including factors for the efficiencies of gamma-ray transport and detection. These factors vary for each element according to its energy spectrum and the point of origin of the gamma rays.

Based on Equation 9, one can compute the formation weight fraction $W_i^f$ of the $i^{th}$ element from the measured relative yields. Unlike the simple infinite homogeneous example, the conversion from the relative yield to the weight fraction involves a gain factor and an offset. The gain factor (FY2W) is driven by the spatial distribution of the neutron flux, including its evolution over time, and the relative probabilities (or cross sections) for neutron interactions with the set of elemental nuclei in the different regions, as well as the detector response (comprising aspects like source-to-detector spacing, detector efficiency, and so on). The gain factor may be obtained as a function of geometrical or compositional properties of the environment (such as bit size), or from an oxide closure computation, or as a function of other detector-based measurements (detector count rate ratios, apparent sigma, etc.), or from computational modeling, or local calibrations, or a combination of any of those methods. The offset factor is proportional to the borehole weight fraction of the $i^{th}$ element. When the borehole region has no $i^{th}$ element present, the offset is equal to zero. The computation of formation weight fractions can be expressed as follows:

$$W_i^f = \frac{\rho_i^f}{\rho^f} = \left(1 + \frac{\phi^b \cdot \rho^b}{\phi^f \cdot \rho^f}\right) \cdot \frac{\frac{Y_i}{S_i}}{\sum_j \frac{Y_j}{S_j}} - \frac{\phi^b \cdot \rho_i^b}{\phi^f \cdot \rho^f} = FY2W \cdot \frac{Y_i}{S_i} - Beff \cdot \frac{\rho_i^b}{\rho^f} \quad (10)$$

In this treatment, the coefficient Beff is defined as the ratio of the neutron flux in the borehole region with respect to the neutron flux in the formation region. It is a strong function of DOI. The deeper the DOI, the smaller the coefficient. Therefore, we can use one apparent weight fraction measurement with a shallow DOI to compensate the other apparent weight fraction measurement with a deeper DOI, no matter how much of this element is present in the borehole region. Once again, the FY2W factor is a gain factor on the elemental yields, and it now describes the normalization of the total sensitivity-weighted yields as well as how much of the total yields arise from the formation versus borehole, based on the flux-weighted densities in the two regions.

The above analysis neglects the different detection probability of gamma rays from the borehole and formation. The neutron flux terms from Equation 10 can be weighted by their relative importance G, which may be interpreted as the relative probabilities for detecting gamma rays from each region or position. The expanded expression is:

$$W_i^f = \frac{\rho_i^f}{\rho^f} = \left(1 + \frac{\phi^b G^b \rho^b}{\phi^f G^f \rho^f}\right) \cdot \frac{\frac{Y_i}{S_i}}{\sum_j \frac{Y_j}{S_j}} - \frac{\phi^b G^b \rho_i^b}{\phi^f G^f \rho^f} = FY2W \cdot \frac{Y_i}{S_i} - Beff \cdot \frac{\rho_i^b}{\rho^f} \quad (11)$$

where $G^b$ and $G^f$ are the relative probabilities for detecting an average gamma ray that originates in the borehole and formation, respectively. The gain FY2W is redefined to contain the new factors, and the coefficient Beff is now the ratio of importance-weighted neutron fluxes in the two regions. In practice, the new factors are automatically subsumed within an empirical calibration. FY2W can be derived in the same ways as described above. Similarly, Beff can be derived as a function of geometrical or compositional properties of the environment (such as bit size), or as a function of other detector-based measurements (e.g., detector count rate ratios, apparent sigma, . . . ), or from computational modeling, or local calibrations, or a combination of any of those methods.

When applying the techniques that will be discussed in the present disclosure, it can be advantageous to first convert the yields into formation elemental weight concentrations. In this way, two apparent elemental weight fraction measurements with two different DOIs will read the same value when this element is present in the formation region, but not present or significantly present (e.g., in a large enough concentration that would be detectable) in the borehole. The two will separate when this element is present in the borehole region, and the difference is relatable to the amount of the element in the borehole. It would be appreciated by one of ordinary skill in the art that the formation elemental weight fraction may not be the sole quantity to which the relative yields can be converted to enable the use of the techniques in the present disclosure. The gain factor FY2W can be generalized as a normalization factor, which is used to normalize two relative elemental yields with different DOI to the same value when this element is present in the formation region, but not present or significantly present in other regions (e.g., the borehole 16). This normalization factor (or gain factor, or FY2W) can be a constant value for one relative yield measurement (when the borehole condition in the well is constant and stable), so that it can be determined locally. This factor can also be determined using the known downhole parameters, such as bit size, casing size, casing weight, borehole fluid type, borehole fluid density, formation lithology, formation porosity, and so on. This factor can be calculated depth by depth using the oxide closure method or based on a capture gamma-ray decay rate, an apparent sigma value that may balance contributions from elements present in both a borehole and a formation.

The present techniques are directed to techniques to separate the elemental contributions in the apparent elemental weight percentages, such as the borehole and formation elemental contributions in an apparent elemental weight percent. The present techniques combine at least two independent measurements of an element, where each measurement has a different characteristic depth of investigation, to estimate the borehole or formation contributions to the elemental measurement. Some techniques combine a measurement from two detectors. Some techniques combine two measurements made by a single detector (e.g., either first detector 42 or second detector 44). These techniques are discussed in detail below. These techniques are relevant for borehole evaluation applications such as cement integrity, casing corrosion, scale detection, production holdup, borehole salinity, gravel pack evaluation, or the like, or formation evaluation applications such as rock lithology, formation hydrogen, formation salinity, formation porosity, oil saturation, water saturation, fluid typing, or the like.

Figure 6:
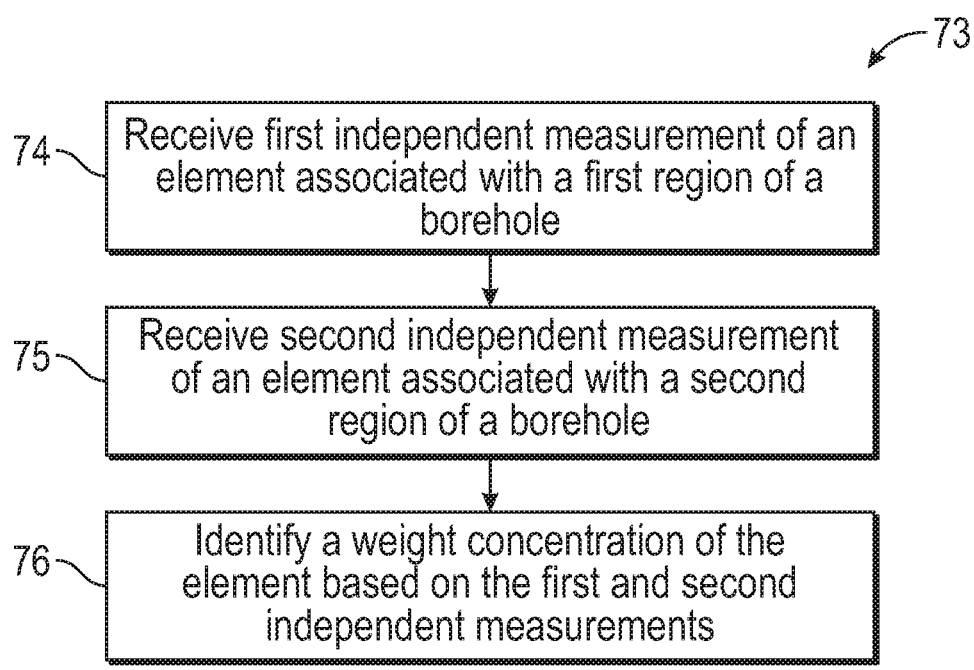
FIG. 6 is a flow diagram illustrating an elemental yield evaluation method, in accordance with an embodiment.

FIG. 6 illustrates an example of a process 73 for determining an elemental weight percent and/or element concentration based on measurements from one or more detector. Although described in a particular order, which represents a particular embodiment, it should be noted that the process 73 may be performed in any suitable order. Additionally, embodiments of the process 73 may omit process blocks and/or include additional process blocks. Moreover, in some embodiments, the process 73 may be implemented at least in part by executing instructions stored in a tangible, non-transitory, computer-readable medium, such as memory 32 implemented in a data processing system 28, using processing circuitry, such as a processor 30 implemented in the data processing system 28.

The process 73 includes receiving (process block 74) a first independent measurement of an element associated with a first region of a borehole. The process 73 also includes receiving (process block 75) a second independent measurement of an element associated with a region of a geological formation. As discussed herein, each independent measurement (e.g., the first independent measurement and the second independent measurement) generally represents a different DOI within the geological formation 14. For example, the first independent measurement may be different from the second independent measurement in that each independent measurement is acquired by different detectors, is acquired at different DOIs with a single or multiple detectors, acquired at different timing gates (e.g., early timing gate and a late timing gate), or are from difference sources (e.g., capture or inelastic, early capture or late capture, and the like). In some embodiments, each measurement may relate to a single element and each independent measurement relates to the same element.

It should be noted that the type of independent measurements may depend on the element being investigated. For example, certain elements may be detectable from inelastic scattering of gamma-rays or capture events. Further, the process includes identifying (process block 76) a weight percent of the element based on the first and second independent measurements. In some embodiments, the weight percent of the element is identified based on a difference or ratio of the first independent measurement, the second independent measurement, or any additional independent measurements.

In some embodiments, the combination of elemental measurements is performed with apparent elemental weight concentrations, as computed above. As discussed earlier, the FY2W in FIG. 7 can be generalized as a gain factor or normalization factor, and the apparent elemental weight concentration can be generalized as normalized relative yield measurements.

Figure 7:
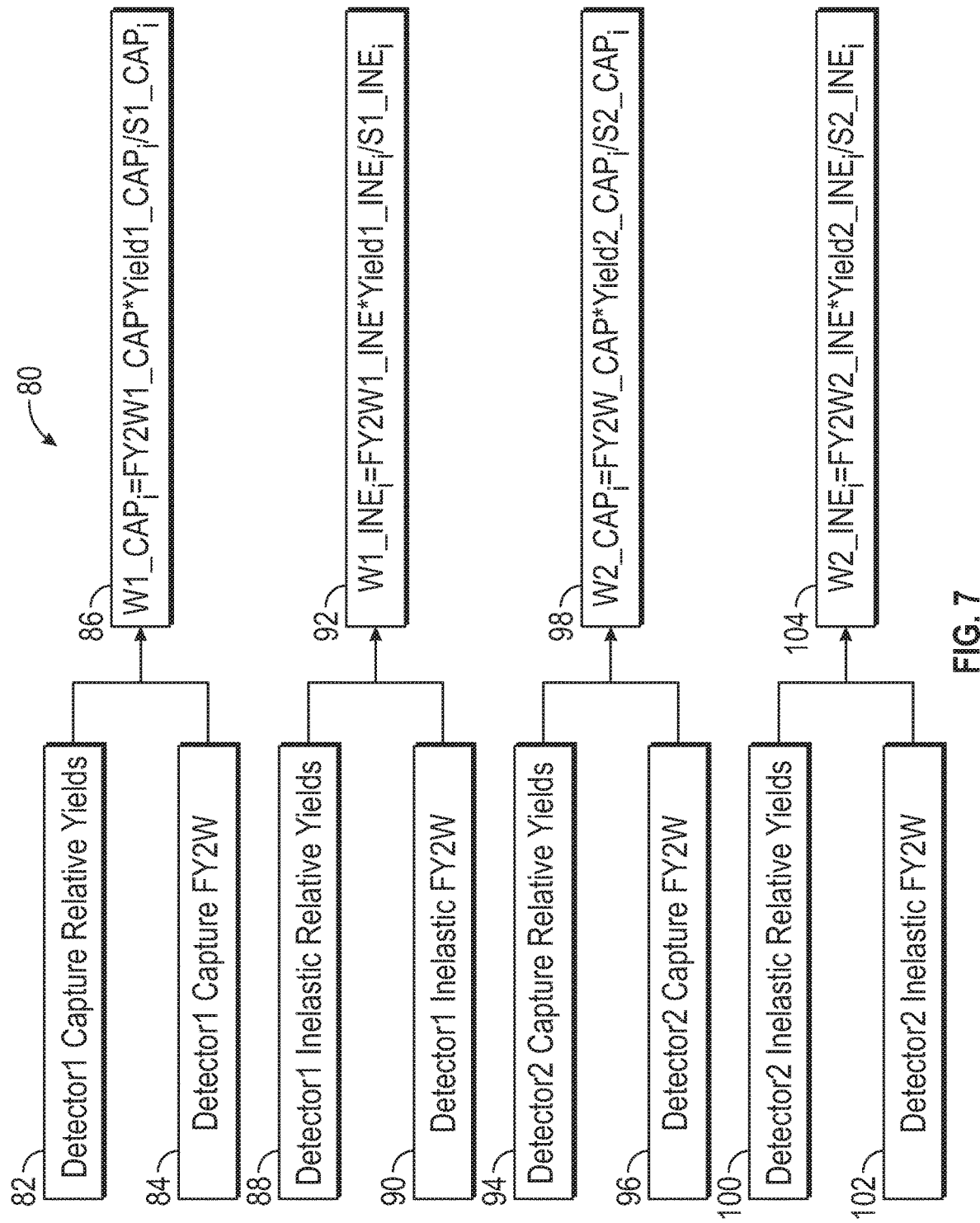
FIG. 7 is a flow diagram illustrating a method for determining apparent element weight, in accordance with an embodiment.

Following the process 80 in FIG. 7, one can compute the apparent capture elemental weight percent and apparent inelastic elemental weight percent for one or multiple detectors. The phrase "weight percent" refers to the concentration of an element measured as a percentage of the total weight of a set of elements, such as those comprising the formation. The process 80 includes a combining a detector 1 capture relative yield 82 and a detector 1 capture FY2W to determine the apparent capture elemental weight for a first detector (e.g., detector 40). The process 80 also includes combining detector 1 inelastic relative yields and a detector 1 inelastic FY2W to determine an apparent inelastic elemental weight percent 92 for the first detector. Further, the process 80 includes combining detector 2 capture relative yields 94 with a detector 2 capture FY2W to determine an apparent capture elemental weight 98 percent for a second detector (e.g., detector 42). Further still, the process includes combining detector 2 inelastic relative yields 100 with detector inelastic FY2W 102 to determine an apparent inelastic element weight percent 104 for the second detector.

The concentrations may also be measured as weight fractions or any other suitable units. S1_CAPi is the capture relative sensitivity (normalized by silicon sensitivity) for the $i^{th}$ element and first detector 42. S1_INEi is the inelastic relative sensitivity (normalized by silicon sensitivity) for the $i^{th}$ element and detector 42. W1_CAPi is the apparent capture elemental weight percent for the $i^{th}$ element and first detector 42. W1_INEi is the apparent inelastic elemental weight percent for the $i^{th}$ element and first detector 42. The term "apparent" means it may contain some borehole effects. If there's no $i^{th}$ element in the borehole, the apparent $i^{th}$ element weight percent will be an accurate formation elemental weight percent. If the $i^{th}$ element is present in the borehole, some of the contribution to the relative yield of the $i^{th}$ element will come from the borehole and the apparent $i^{th}$ element weight percent will contain borehole signal. In some cases, the apparent elemental weight percent can be larger than 100%. (One such example would be the apparent iron weight percent in a cased hole with a lot of iron in the casing, because the computation of FY2W is designed to describe the formation elements.)

Figure 8:
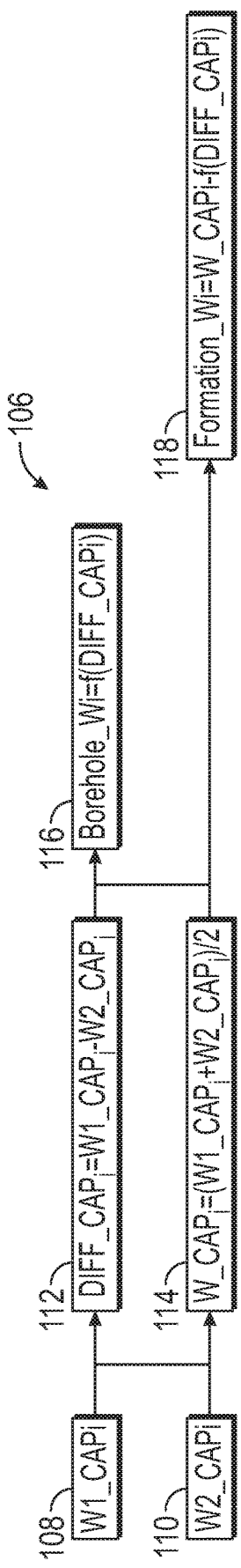
FIG. 8 is a flow diagram illustrating a first method for determining borehole and formation compensation, in accordance with an embodiment.

In one example embodiment of the process 73, each independent measurement (e.g., the first independent measurement, the second independent measurement, and additional independent measurements) is acquired by different detector. To illustrate one embodiment of the process 73, FIG. 8 shows an example of a process 106 for determining a weight percent of an element based on capture measurements from two detectors. In general, a first capture weight percent 108 and a second capture weight percent 110 are received as inputs. A difference 112 between the first capture weight percent 108 and the second capture weight percent 110 is determined by a processor (e.g., processor 30). Additionally, an average capture weight percent 114 may be determined. A borehole weight percent 116 may be determined based on the difference 112 and a formation weight percent 118 may be determined based on the difference 112 and the average capture weight percent 114.

The first detector 42 shown in FIG. 2 has a shorter source-to-detector spacing, which provides a shallower depth of investigation than the second detector 44, which has a longer source-to-detector spacing. Shielding and different radial positioning of the detectors may also be used to enhance the borehole sensitivity of the shallow detector and to enhance the relative formation sensitivity of the deep-reading detector. The apparent elemental weight percent measured by the short spacing detector will have more borehole elemental contribution and less formation elemental contribution than the one measured by the long spacing detector. Following the process 106 shown in FIG. 7, one can compute the difference and the average between the two. When there is no $i^{th}$ element present in the borehole, the two apparent weight percent from the two detectors should read the same, the difference is zero, and the average will be the measured formation elemental weight percent. When there is a non-zero amount of the $i^{th}$ element present in the borehole, the two detector measurements will separate and the difference can be used for a borehole evaluation. A borehole elemental weight can be computed from the difference, using a function that may also take inputs of borehole geometry parameters (hole size, casing size, casing weight, casing ID, tubing size, etc.). Furthermore, the difference can also be used to compensate borehole contribution in the apparent weight percent measured by either of the detectors or the average one. Some additional measurements or user input parameters can help to improve the accuracy of the compensation. Those can be (but are not limited to) the estimated FY2W for one of the detectors, hole size, casing size, apparent sigma measurements, ratios of count rates from one detector to another during various timing windows, and so on. One such example of a compensation function may be expressed as:

$$\text{Borehole\_}Wi = f(\text{DIFF\_CAPi}) = \text{DIFF\_CAPi} * \Sigma_k a_k (FY2W\_1\_CAP)^k \quad (12)$$

where Borehole_Wi is the borehole elemental weight percent, DIFF_CAPi is the difference between the apparent weight percent of the two detectors, as shown in the process 106 of FIG. 7, and FY2W_1_CAP is the estimated FY2W of detector 1 for the capture analysis. This example uses a polynomial function of FY2W for the borehole compensation function, where the polynomial may be a second-order (quadratic) polynomial. It will be appreciated by those skilled in the art that other compensation functions are also possible using the above non-inclusive list of inputs.

In some applications, the borehole apparent weight percent can be filtered or averaged before being applied as a compensation for the formation weight percent. The filtering may be performed with respect to measurement depth or time, and may serve to reduce statistical noise in the borehole estimate. The difference DIFF_CAPi can be filtered directly, or the filtering may be performed on Borehole_Wi. Filtering can have many forms from a boxcar filter to more complex filters, including Bayesian filter methods such as Kalman filters or higher order fits to the borehole contributions. Sharp transitions can be handled by adaptive filtering.

Figure 9:
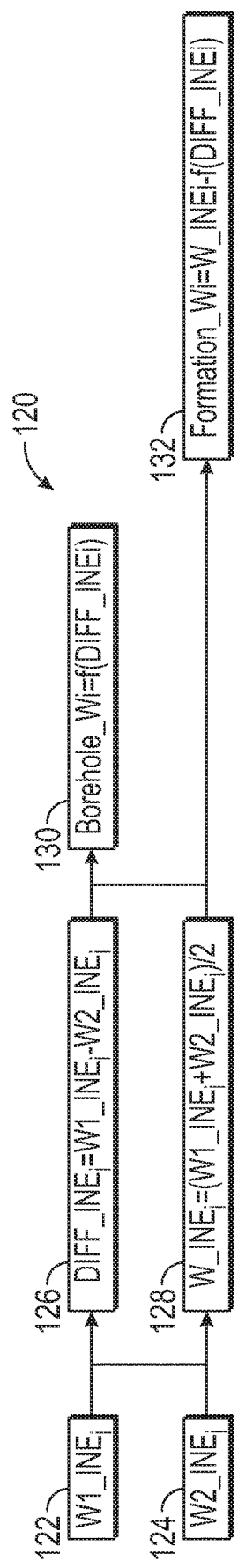
FIG. 9 is a flow diagram illustrating a second method for determining borehole and formation compensation, in accordance with an embodiment.

To illustrate another embodiment of the process 73, FIG. 9 shows an example of a process 120 for determining a weight percent of an element based on capture measurements from two detectors. The process 120 uses the apparent inelastic elemental weight percent measured by two detectors, instead of their capture weights as shown in the process 106. In general, a first inelastic weight percent 122 and a second inelastic weight percent 124 are received as inputs. A difference 126 between the first inelastic weight percent 122 and the second inelastic weight percent 124 is determined by a processor (e.g., processor 30). Additionally, an average inelastic weight percent 128 may be determined. A borehole weight percent 130 may be determined based on the difference 126 and a formation weight percent 132 may be determined based on the difference 126 and the average inelastic weight percent 128. The discussion from the illustrated process 106 are also applicable here, including regarding the compensation correction, the use of additional inputs, and the use of filtering.

The processes 106 and 120 are more suitable for multi-detector spectroscopy measurements. Some spectroscopy tools may have one detector. In that case, the processes 134 and 148 shown in FIG. 10 and FIG. 11, respectively) can be used. To illustrate another embodiment of the process 73 which may be employed using independent measurements from a single detector, FIG. 8 shows an example of a process 134 for determining a weight percent of an element based on capture measurements from two detectors. The process 134 uses the apparent inelastic and capture elemental weight percent measured by one detector. As shown, a capture weight percent 136 and an inelastic weight percent 138 are received as inputs. A difference 140 between the capture weight percent 136 and inelastic weight percent 138 is determined by a processor (e.g., processor 30). Additionally, an average weight percent 142 may be determined. A borehole weight percent 144 may be determined based on the difference 140 and a formation weight percent 146 may be determined based on the difference 140 and the average weight percent 142. The discussion from the method illustrated by process 106 is also applicable here, including regarding the compensation correction, the use of additional inputs, and the use of filtering.

Figure 10:
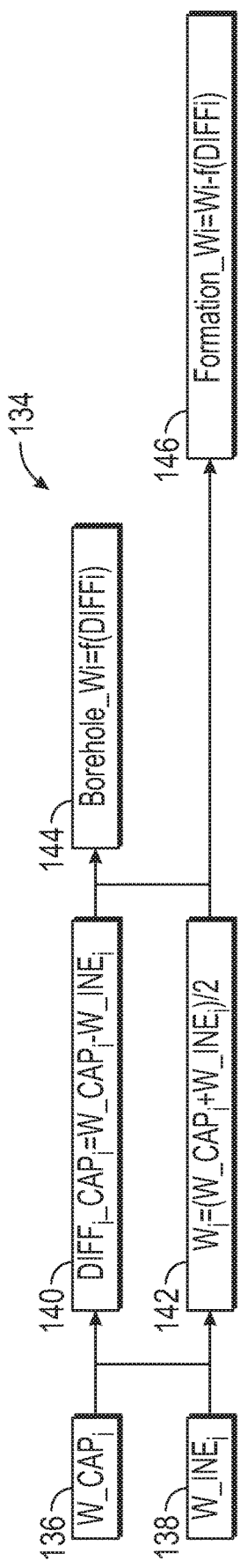
FIG. 10 is a flow diagram illustrating a third method for determining borehole and formation compensation, in accordance with an embodiment.

The process 134 of FIG. 10 illustrates the basic principle of another embodiment of the present techniques. It uses the apparent weight percent of an element that can be measured by both capture and inelastic spectroscopy. The capture measurement can have a deeper DOI than the inelastic measurement. So, the capture apparent weight percent can have more formation contribution and less borehole contribution than the inelastic one. Following the same principle, the difference can be used for borehole evaluation, and to compensate the borehole contribution in the individual capture or inelastic apparent weight percents or the average one to get an accurate formation elemental weight percent for formation evaluation applications. This method can may be applied to elements which may be measured by both capture and inelastic spectroscopy, including $S_i$, Ca, Mg, Al, Fe, S, and so on.

Figure 11:
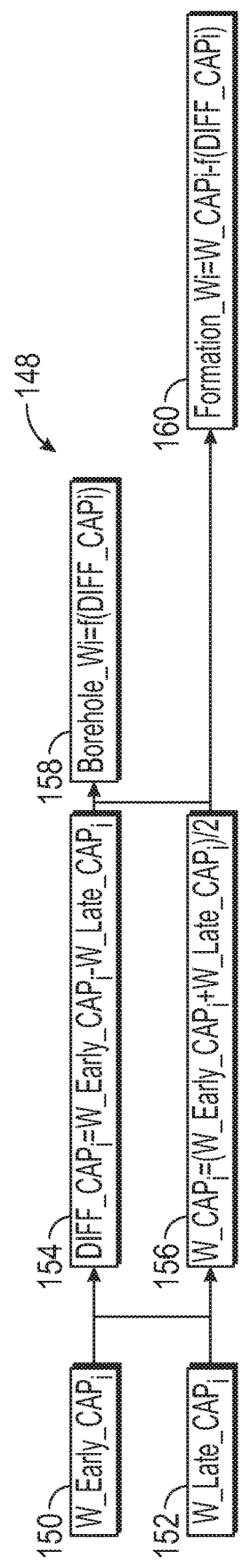
FIG. 11 is a flow diagram illustrating a fourth method for determining borehole and formation compensation, in accordance with an embodiment.

For the elements which may be measured by capture but not inelastic scattering, the process 148 illustrated in FIG. 11 can be used. FIG. 11 shows an example of a process 148 for determining a weight percent of an element based on capture measurements from one or two detectors. As shown, an early capture weight percent 150 and a late capture weight percent 152 are received as inputs. A difference 154 between the early capture weight percent 150 and the late capture weight percent 152 is determined by a processor (e.g., processor 30). Additionally, an average capture weight percent 156 may be determined. A borehole weight percent 158 may be determined based on the difference 154 and a formation weight percent 160 may be determined based on the difference 154 and the average capture weight percent 156. The discussion from the illustrated processes 106, 120, and 134 are also applicable here, including regarding the compensation correction, the use of additional inputs, and the use of filtering.

The capture spectra (e.g., early capture and late capture) recorded during different timing gates (relative to the neutron burst-on time) will have different DOI. The data acquired in an early timing gate (sooner after the neutron bursts) has a shallower DOI, more borehole contribution, and less formation contribution than the one in a later timing gate. Following the same principle, the difference can be used for borehole evaluation, and to compensate the borehole contribution in the individual early or late capture apparent weight percent or the average one to get an accurate formation elemental weight percent for formation evaluation applications.

All the above processes (e.g., process 106, process 120, process 134, and process 148) and combinations of elemental measurements may be applied to normalized spectral yields directly, in addition to or as an alternative to the use of elemental weight concentrations. An environmentally dependent correction factor may account for the "gain" effects that were introduced previously and which are handled in the above methods by the FY2W factor. For example, the yields of two different detectors may be combined (analogous to process 106), with Yield1_CAPi being the capture yield for element i from detector 1, and with Yield2_CAPi being the capture yield for element i from detector 2. The difference Yield_Diff_CAPi is the difference between the two yields, and the compensated borehole yield may be defined as Borehole_Yi=f(Yield_Diff_CAPi, env), which uses the yield difference in a correction function which is a function of the surrounding environment. The inputs to the function may be geometrical or compositional properties of the environment (such as bit size) and/or they may be other measurements (detector count rate ratios, apparent sigma, etc.). The borehole yield can be used to correct either of the separate detector yields or an average of the two. The corrected borehole or formation yields can be used to estimate some aspect of the borehole or formation regions.

The following discussion presents several non-limiting examples of embodiments of the present techniques described herein.

Example 1

Hydrogen may be measured by capture spectroscopy. One can use the process 106 (if with two detectors) or the process 148 (with single detector) to get formation and borehole hydrogen weight percent. The formation hydrogen can be used for formation evaluation to get water vs oil saturation, total porosity, kerogen maturity or other kerogen properties (if combined with carbon measurement), formation salinity (if combined with chlorine and carbon measurements), and so on. The borehole hydrogen can be used to get borehole liquid vs gas holdup (since liquid has a lot more hydrogen than gas), borehole salinity (if combined with borehole chlorine and carbon measurements), scale buildup (scale built up inside the casing will exclude completion brine and cause borehole hydrogen to decrease), and so on.

Example 2

Chlorine may be measured by capture spectroscopy. One can use the process 106 (if with two detectors) or the process 148 (with a single detector) to get formation and borehole chlorine weight percent. The formation chlorine can be used for formation evaluation to get water vs oil saturation, formation salinity (if combined with hydrogen and carbon measurements or with measurements of total porosity, lithology, and carbon), and so on. The borehole chlorine can be used to get borehole water vs oil/gas holdup, borehole salinity (if combined with borehole hydrogen and carbon measurements), and so on. One of ordinary skill in the art would appreciate that the techniques of the present disclosure do not require the use of elemental ratios as the two independent measurements, either from the two detectors or two acquisition times. For example, to estimate salinity of the formation or borehole, the techniques of the present disclosure do not use a Cl/H ratio for each detector. Rather, the techniques of the present disclosure show how the two independent measurements of Cl are combined to estimate the absolute Cl concentration in the borehole or formation. The same procedure can be applied to estimate the absolute concentration of H in either region. And the absolute Cl and H concentrations can be combined to estimate the salinity of either region, if desired.

Example 3

Calcium may be measured by both capture and inelastic spectroscopy. All processes, 106, 120, 134, and 148 can be applied to calcium. Since cement typically contains calcium, the borehole calcium can be used for cement evaluation and well integrity applications. The formation calcium can be used to solve the formation rock lithology (quartz has no calcium while carbonate has calcium).

Example 4

Silicon may be measured by both capture and inelastic spectroscopy. All processes 106, 120, 134, and 148 can be applied to silicon. Since some type of cements can contain silicon, the borehole silicon can be used for cement evaluation and well integrity applications. Gravel pack contains a lot of silicon, so the borehole silicon can also be used for gravel pack evaluation. The formation silicon can be used to solve the formation rock lithology (quartz has silicon while carbonate has none).

Example 5

Iron may be measured by both capture and inelastic spectroscopy. All processes 106, 120, 134, and 148 can be applied to iron. Since casing typically contains a lot of iron, the borehole iron can be used for casing corrosion and well integrity applications. The formation iron can be used to solve the formation rock lithology (shale, pyrite).

Example 6

Carbon may be measured by inelastic spectroscopy, and thus, the process 120 can be applied. The borehole carbon can be used for borehole oil holdup measurement. The formation carbon can be used for oil saturation measurement, kerogen volume measurement, or evaluation of kerogen maturity or other kerogen properties such as density (if combined with formation hydrogen and other measurements). As noted above in Example 2, this application is novel and distinct from prior art because the techniques of the present disclosure do not require the use of elemental ratios as the two independent measurements from the two detectors. For example, to estimate the oil saturation of the formation, the techniques of the present disclosure do not use a C/O ratio for each detector. Rather, the techniques of the present disclosure teach how the two independent measurements of C are combined to estimate the absolute C concentration in the borehole or formation. This information can be used directly to estimate borehole oil holdup or formation oil saturation.

Example 7

Oxygen may be measured by inelastic spectroscopy. For example, the process 120 may be applied. The borehole oxygen can be used for borehole water vs. oil holdup measurement. The formation oxygen can be used for rock lithology and water vs oil saturation measurement.

Example 8

Potassium may be measured by both capture and inelastic spectroscopy. All processes 106, 120, 134, and 148 can be applied to potassium. Some drilling fluids contain KCl brine or other potassium-bearing additives which create a borehole contribution to the total potassium measurement. The formation potassium, after compensation for the borehole signal, can be used for rock lithology (for example, feldspars contain potassium).

Example 9

Gadolinium may be measured by capture spectroscopy. One can use the process 106 (if with two detectors) or the process 148 (with single detector) to get formation and borehole gadolinium weight percent. The formation gadolinium measurement can be used to solve lithology, and shale volume. In some applications, the cased hole cement can be doped with gadolinium, so that the borehole gadolinium measurement can be used for cement evaluation. The gravel packs can also be doped with gadolinium, in that case the borehole gadolinium measurement can be used for gravel pack evaluation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A system for determining a property of a geological formation, comprising:
   a neutron source configured to emit neutrons into a borehole of the geological formation;
   two or more gamma-ray detectors configured to receive gamma rays resulting from interactions between the neutrons emitted by the neutron source and the geological formation to generate a plurality of independent measurements, wherein each independent measurement of the plurality of independent measurements is associated with a different region within the geological formation or the borehole, or both the geological formation and the borehole; and a processor configured to:

acquire a first energy spectrum which contains at least in part a first independent measurement of the plurality of independent measurements;

acquire a second energy spectrum which contains at least in part a second independent measurement of the plurality of independent measurements; and determine an elemental concentration based at least in part on a combination of the first energy spectrum and the second energy spectrum, wherein a first independent measurement of the plurality of independent measurements comprises a capture measurement and wherein a second independent measurement of the plurality of independent measurements comprises an inelastic measurement.

2. The system of claim 1, wherein at least two independent measurements of the plurality of independent measurements are from different detectors of the two or more gamma-ray detectors.

3. The system of claim 2, wherein a first independent measurement of the plurality of independent measurements comprises a capture measurement acquired in a first timing gate relative to a pulsed neutron burst emitted by the neutron source and a second independent measurement of the plurality of independent measurements comprises a capture measurement acquired in a second timing gate relative to the pulsed neutron burst emitted by the neutron source.

4. The system of claim 2, wherein the at least two independent measurements of the plurality of independent measurements comprise capture measurements.

5. The system of claim 4, wherein the energy spectra contain gamma rays from at least one element, the at least one element comprising hydrogen, chlorine, or both.

6. The system of claim 2, wherein the at least two independent measurements of the plurality of independent measurements comprise inelastic measurements.

7. The system of claim 6, wherein the energy spectra contain gamma rays from at least one element, the at least one element comprising carbon, oxygen, or both.

8. The system of claim 1, wherein a first gamma-ray detector of the two or more gamma-ray detectors is configured to acquire a first energy spectrum of the energy spectra from a first depth of investigation, and wherein a second gamma-ray detector of the two or more gamma-ray detectors acquires a second energy spectrum of the energy spectra from a second depth of investigation.

9. The system of claim 1, wherein the processor is configured to:

determine an apparent borehole weight concentration based at least in part on an additional combination of at least two of a plurality of element yields, wherein the elemental concentration is determined based at least in part on the apparent borehole weight concentration.

10. A method for determining an elemental concentration in a geological formation, comprising:

emitting neutrons, from a neutron generator placed into a borehole in the geological formation, to cause capture events and inelastic scattering events that generate photons;

detecting, using one or more detectors, the photons associated with the capture events to generate a plurality of independent measurements, wherein a first independent measurement of the plurality of independent measurements comprises capture measurements and wherein a second independent measurement of the plurality of independent measurements comprises inelastic measurements;

acquiring a first energy spectrum which contains at least in part the first independent measurement;

acquiring a second energy spectrum which contains at least in part the second independent measurement; and determining the elemental concentration based at least in part on a combination of the first energy spectrum and the second energy spectrum, wherein the borehole of the geological formation is completed with casing, cement, tubing, or gravel packs, or any combination thereof, and wherein the elemental concentration relates to an element present in both the geological formation and the casing, cement, tubing, or gravel packs, or any combination thereof.

11. The method of claim 10, wherein the first energy spectrum and the second energy spectrum contain gamma rays from at least one element, the at least one element comprising calcium, silicon, iron, potassium, aluminum, and sulfur.

12. The method of claim 10, comprising determining an apparent borehole weight concentration based at least in part on a combination of the first energy spectrum and the second energy spectrum, wherein the elemental concentration is determined based at least in part on the apparent borehole weight concentration.

13. The method of claim 12, comprising filtering the apparent borehole weight concentration to generate a filtered apparent borehole weight concentration, wherein the elemental concentration is determined based at least in part on the filtered apparent borehole weight concentration.

14. The method of claim 10, wherein the photons are detected during a time period defined by timing gates occurring during a pulsing scheme of the neutron generator, operatively controlled by a processor.

15. A method for determining an elemental concentration in a geological formation, comprising:

emitting neutrons, from a neutron generator, placed into the borehole in the geological formation, to cause capture and inelastic scattering events that generate photons;

detecting, using one or more detectors, the photons associated with the capture events to generate a plurality of independent measurements, wherein a first independent measurement of the plurality of independent measurements comprises early capture measurements and wherein a second independent measurement of the plurality of independent measurements comprises late capture measurements;

acquiring a first energy spectrum which contains at least in part the first independent measurement;

acquiring a second energy spectrum which contains at least in part the second independent measurement; and determining the elemental concentration based at least in part on a combination of the first energy spectrum and the second energy spectrum.

16. The method of claim 15, wherein the elemental concentration relates to an element present in both the geological formation and cement present in the borehole of the geological formation.

17. The method of claim 15, wherein the energy spectra contain gamma rays from chlorine.

18. The method of claim 15, comprising determining an apparent borehole element weight concentration based at least in part on an additional combination of at least two of the plurality of element yields, wherein the elemental concentration is determined based at least in part on the apparent borehole weight concentration.

* * * * *